(12) United States Patent
Trump

(10) Patent No.: US 11,351,555 B2
(45) Date of Patent: Jun. 7, 2022

(54) HOLDER HAVING A STACK OF COVERSLIPS OR SPECIMEN SLIDES

(71) Applicant: Leica Biosystems Nussloch GmbH, Nussloch (DE)

(72) Inventor: Tobias Trump, Frankenthal (DE)

(73) Assignee: Leica Biosystems Nussloch GmbH, Nussloch (DE)

(*) Notice: Subject to any disclaimer, the term of this patent is extended or adjusted under 35 U.S.C. 154(b) by 163 days.

(21) Appl. No.: 16/721,720

(22) Filed: Dec. 19, 2019

(65) Prior Publication Data

US 2020/0139376 A1 May 7, 2020
US 2021/0086188 A9 Mar. 25, 2021

Related U.S. Application Data

(63) Continuation of application No. PCT/EP2019/055218, filed on Mar. 1, 2019.

(30) Foreign Application Priority Data

Mar. 15, 2018 (EM) .................................. 004757896
Jul. 16, 2018 (DE) ...................... 20 2018 104 076.6

(51) Int. Cl.
*B01L 9/00* (2006.01)

(52) U.S. Cl.
CPC ........... *B01L 9/52* (2013.01); *B01L 2300/022* (2013.01); *B01L 2300/0609* (2013.01); *B01L 2300/0809* (2013.01); *B01L 2300/0851* (2013.01); *B01L 2300/0858* (2013.01)

(58) Field of Classification Search
None
See application file for complete search history.

(56) References Cited

U.S. PATENT DOCUMENTS

2005/0165287 A1* 7/2005 Wescott .................... B01L 9/06
600/322
2005/0238541 A1 10/2005 Barski et al.
2007/0080093 A1* 4/2007 Boozer ............ G01N 33/48778
206/569
2007/0205126 A1 9/2007 Elsener et al.
2010/0083777 A1 4/2010 Walter et al.
2011/0181875 A1* 7/2011 Nakahana ............. B01L 3/5453
356/246
2011/0308335 A1* 12/2011 Pink ........................ G06K 1/126
73/864.91
2012/0138499 A1 6/2012 Berberich et al.
(Continued)

FOREIGN PATENT DOCUMENTS

JP 2009222443 A 10/2009
WO 2005/037182 A2 4/2005
WO WO-2016135186 A1 * 9/2016 ................ B01L 9/52

*Primary Examiner* — Matthew D Krcha
(74) *Attorney, Agent, or Firm* — Hodgson Russ LLP

(57) ABSTRACT

A holder (40) for holding a stack (10) of coverslips (11) or specimen slides (11) has a bottom (20) having at least one side wall (21a, 21b, 22a, 22b) connected thereto, wherein an inner side of the bottom (20) is embodied for placement of the stack (10) of coverslips (11) or specimen slides (11) and carrying that stack (10), and an outer side of the bottom (20) and/or an outer side of the at least one side wall is configured to receive an identification label, such as an RFID (30), and the holder includes such the identification label, such as an RFID (30).

9 Claims, 3 Drawing Sheets

(56) References Cited

U.S. PATENT DOCUMENTS

2014/0027333 A1* 1/2014 Pawlowski ........... A61M 5/001
206/438
2017/0343571 A1 11/2017 Harrison et al.

\* cited by examiner

HOLDER HAVING A STACK OF COVERSLIPS OR SPECIMEN SLIDES

CROSS-REFERENCE TO RELATED APPLICATIONS

The present application is a continuation of International Application No. PCT/EP2019/055218 filed Mar. 1, 2019, which claims priority to European Community Design Application No. 004757896 filed Mar. 15, 2018, and to German Utility Model Application No. 20 2018 104 076.6 filed Jul. 16, 2018. The entire disclosures of the aforementioned applications are incorporated herein by reference.

FIELD OF THE INVENTION

The present invention relates to a holder or a cartridge having a stack of coverslips. Specimen slides can also be used instead of coverslips.

BACKGROUND OF THE INVENTION

In microscopic investigation methods, coverslips are used in order to position and protect a sample that is present on a specimen slide for subsequent investigation in the microscope. Such samples can be, for example, tissue samples, which are applied in the form of a thin, stained layer onto a specimen slide for subsequent (fluorescence) microscopy investigation. The tissue sample is usually embedded in paraffin wax before it is sectioned into thin layers. The process of embedding, sectioning, and staining, and subsequent coverslipping with a coverslip, is performed automatically in corresponding automatic machines; the individual automatic machines can also be connected to one another, and the sample or the specimen slide can be transferred (semi-) automatically by way of robot arms.

The coverslips that are used to coverslip the sample are extremely thin and easily broken. A coverslip is usually taken from a stack of coverslips by a robot arm using suction cups, and then placed onto the sample that is to be coverslipped. For that purpose, the stack of coverslips must be stocked in a holder or cartridge, and the holder or cartridge should be configured so as to permit easy access by the robot arm to the individual coverslips. Because processes are becoming increasingly automated, it is furthermore desirable to be able to furnish further information regarding the coverslips and/or the cartridge and/or the coverslipping process. The specimen slides onto which the samples are placed can also be stocked in a holder or cartridge, and analogous statements apply in that regard to the handling of the specimen slides.

The object on which the invention is based is therefore that of describing a holder or a cartridge having a stack of coverslips or specimen slides, having the corresponding properties.

SUMMARY OF THE INVENTION

This object is achieved by a holder or a cartridge of the present disclosure. Advantageous embodiments are evident from the description that follows.

The holder (cartridge) according to the present invention, having a stack of coverslips or specimen slides, comprises a bottom having at least one side wall connected thereto, the inner side of the bottom being embodied for placement of the stack of coverslips or specimen slides and carrying that stack, and the outer side of the bottom and/or of the at least one side wall being configured to receive an identification label, such as an RFID, and comprising such an identification label, such as an RFID. The at least one side wall, for example, is either a cylindrical side wall having a round or elliptical cross section or, in particular, is four side walls, each two of which are located opposite one another. Other geometries are also conceivable. The inner side of the bottom is embodied for placement of a stack of coverslips or of specimen slides, advantageous embodiments being explained below. The outer side preferably of the bottom is configured for reception of an identification label; such an identification label can be, in particular, a radio frequency identification (RFID) element. An RFID tag of this kind is made up substantially of a transponder (radio label) which contains an identifying code that can be read by a reading device. Coupling to the reading device is accomplished by way of short-range alternating magnetic fields generated by the reading device, or by high-frequency radio waves. With these, not only are data transferred, but the transponder is also provided with energy. A transponder having its own power supply would need to be used in order to achieve longer ranges. Other such identification labels can, of course, be used for the present invention, for example barcodes. The capacity of a RFID tag or RFID chip ranges from a few bits to several kilobytes. Write-capable RFID tags also exist.

Alternatively or additionally, the identification label can also be received in the at least one side wall of the holder. The identification label uniquely identifies the holder or cartridge and/or its contents, so that authenticity can be checked. It is also possible to make the further working process, after placement of the holder or the cartridge into the corresponding automatic machine, dependent on the fact that the data read out from the identification label correspond to preset data. It is also possible to read out data that describe or encode the nature, size, and quantity of the coverslips or specimen slides being used, and/or their utilization. It is thereby possible, for example, to rule out the use of an incorrect coverslip stack for the subsequent coverslipping operation. The result, for example, is to prevent a sample from being coverslipped with coverslips that are too short or too long. On the other hand, it can also be useful to use a write-capable identification label, for example in order to store data such as utilization date, utilization time, utilization location, number of coverslips in the stack, number of remaining coverslips in the stack, etc. Analogous statements apply to the use of specimen slides rather than coverslips.

In the interest of simplicity and with no limitation as to generality, reference will be made hereinafter in particular to coverslips. Corresponding statements apply to specimen slides. Both specimen slides and coverslips can be made of glass or of plastic.

The holder according to the present invention or the cartridge according to the present invention thus simplifies automation of the processes described earlier. A holder of this kind according to the present invention, having a stack of coverslips which is located inside the holder, will also be alternatively referred to in the present Application as a "coverslip stack supply holder." The same is analogously true for a "specimen slide stack supply holder," which refers to a holder according to the present invention having a stack of specimen slides.

In an advantageous embodiment, the outer side of the bottom of the holder comprises a spacer extending substantially perpendicularly to the bottom. The bottom should comprise at least three, preferably four such spacers in order to prevent the holder from tilting or tipping over. These spacers are consequently synonymous with "feet" of the holder. In another embodiment, the spacer is located circumferentially at the edge of the bottom or on at least two, in particular oppositely located, sides of the edge of the bottom. The spacer serves to space the identification label away from contact with the surface on which the holder is sitting. The spacer should extend for that purpose, in the direction perpendicular to the bottom, at least as far as the extent in that direction of a receptacle on the outer side of the bottom having a received identification label. It is thereby possible to prevent the identification label from becoming damaged when the holder is placed onto a supporting surface.

In a further embodiment, the bottom of the holder according to the present invention comprises a recess for, in particular manual, removal of coverslips or of the stack of coverslips (or, as stated, specimen slides). The at least one side wall comprises a corresponding recess. It is thereby possible, for example, for a coverslip stack to be grasped (with the fingers of a hand or with gripping fingers of a robot) from above and from below in the region of the recess when the top side of the holder is open, and to be lifted upward through the top opening of the holder.

It is also advantageous if the holder according to the present invention comprises a bottom having at least one, preferably two holes. These holes are usefully arranged correspondingly to the suction cups of the coverslip gripper. The holes prevent the bottom of the holder itself from being suction-gripped and pulled upward when the stack of coverslips (or, as stated, specimen slides) has been emptied. If both suction cups are connected to the same vacuum line, one hole in the bottom of the holder is sufficient.

In a further advantageous embodiment at least one, in particular foldable, tab is shaped on at the end of at least one of the at least one side wall on the side facing away from the bottom. This tab serves in particular to allow the holder to be held securely and to be placed securely in the device receptacle. When the tab is foldable, it can in particular be folded upward for insertion into the device, to the side after insertion into the device, and downward so that the tab extends parallel to a side wall of the holder. Space can thus be saved when packaging the holder.

In a further advantageous embodiment, guidance grooves are shaped into at least one of the at least one side wall. The guidance grooves can be slots in the side walls, or in principle can also be groove-shaped bulges in the side wall. The guidance grooves on the one hand can serve to align the holder or the cartridge, but alignment of the coverslip stack (or, as stated, the specimen slide stack) by such guidance grooves is, on the other hand, more significant in practice. For example, right-angled profiles that align the coverslip stack in relation to the specimen slide that is to be coverslipped can engage into the guidance grooves. The profiles have usefully already been aligned during assembly, by means of a calibration tool, in alignment with the specimen slide centerer and with the rack. Small spacings with respect to the profiles are necessary in order for the coverslips to be capable of being removed from the holder, so that the coverslip has some play in terms of alignment. For alignment of the coverslip profile by means of the aforesaid profiles, it is advantageous if the guidance grooves are shaped as slots in the relevant side wall.

In a further advantageous embodiment, recesses are present in corner regions of the holder or in the regions in which side walls abut against one another, these recesses extending in particular in the direction of the coverslip stack (or, as stated, the specimen slide stack), i.e. in a direction perpendicular to the bottom. The recesses are located in the corners of the holder or of the cartridge, and/or at the points at which the corners of the coverslips are arranged, and serve to protect the corners of the coverslips. They also allow easier removal of the coverslips, since more play is present as a result.

In a further advantageous embodiment, there is provided in the holder according to the present invention at least one delimiting element that extends into the interior of the holder from the at least one side wall or from at least one of the side walls. The delimiting element can furthermore extend perpendicularly to the bottom of the holder. The delimiting element can thus ensure that only coverslips (or, as stated, specimen slides) having a correspondingly shorter extent (length) can be received in the relevant holders. Without a delimiting element, coverslips having a larger dimension (length) can accordingly be received. It is possible as a result, with no modification to the device or automatic machine, for various coverslip sizes to be capable of being used with holders according to the present invention, the holders having the same external dimensions even for different coverslip sizes.

In a further advantageous embodiment, the delimiting line, facing away from the bottom, of the at least one side wall lies in a plane that encloses an angle with the plane of the bottom of the holder. An oblique delimiting line of this kind for the top opening of the holder serves to allow corresponding gripping arms to reach, in simple fashion, on a curved path into the interior of the holder for a coverslip (or, as stated, a specimen slide).

Alternatively or additionally, the delimiting line of the top opening of the holder or of the cartridge is embodied as a circumferential flange. This makes it possible to insert the holder or cartridge into the device and align it there by the fact that the flange rests on a corresponding counterpart member.

It is useful if the at least one side wall of the holder comprises reinforcing ribs in order to enhance mechanical stability, in particular if the guidance grooves discussed above are present as slots.

Be it noted that the above-described embodiments of the holder or cartridge according to the present invention can be combined in various ways with one another, or also used in isolation. In particular, the present invention is also intended to cover combinations that do not use an identification label. The presence of an identification label can in that regard be only one embodiment of a holder or cartridge according to the present invention that has been described above in a different embodiment.

The invention and its advantages will be explained in further detail below with reference to an exemplifying embodiment.

DETAILED DESCRIPTION

Figure 1:
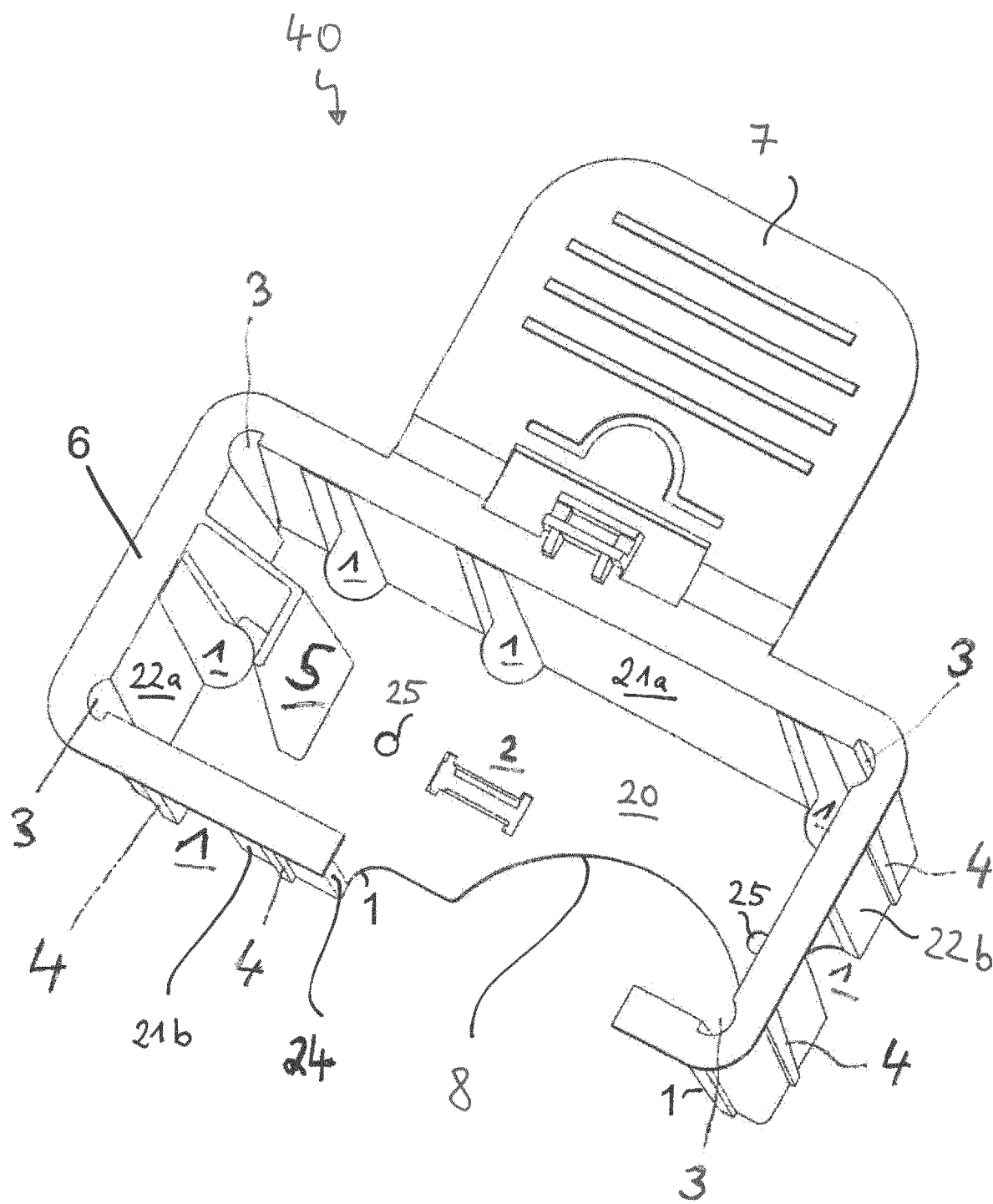
FIG. 1 is a perspective view from above of a holder according to the present invention for a stack of coverslips, in an embodiment.

The exemplifying embodiment in accordance with FIG. 1 shows a holder 40 or cartridge 40 for a stack (not depicted here) of coverslips (or specimen slides), holder 40 comprising a bottom 20 having four side walls 21a, 21b and 22a, 22b, each two of which are located opposite one another. The inner side of bottom 20 is embodied for placement of the stack of coverslips. The outer side of bottom 20 is configured for reception of an identification label, here an RFID, by means of a corresponding RFID receptacle 2. The position of receptacle 2 in bottom 20 can be selected, in principle, arbitrarily. Its position depends principally on the position of the reading device. In principle, receptacle 2 can also be in one of the side walls.

Side walls 22a, 22b and 21a, 21b have reinforcing ribs 4 in order to impart more stability to holder 40. Guidance grooves 1, here constituting slots in the side walls which extend perpendicularly to bottom 20 and end there, are also shaped into the side walls. Guidance grooves 1 serve principally to align the coverslip stack within holder 40. Correspondingly shaped, for example right-angle, profiles engage into guidance grooves 1 and align the coverslip stack in relation to the specimen slide that is to be coverslipped. Small spacings with respect to the profiles engaging into guidance grooves 1 are necessary in order to allow the coverslips to be removed from holder 40, so that the coverslip has some play in terms of alignment. In addition, recesses 3 that also extend in a direction perpendicular to bottom 20 are present in the corner regions of holder 40 where the side walls abut against one another. Recesses 3 serve to protect the corners of the coverslips both during storage and upon removal of the coverslips.

A delimiting element 5 that proceeds from side wall 22a into the interior of holder 40 is evident in the embodiment of holder 40 which is shown in FIG. 1. Delimiting element 5 is, at the same time, perpendicular to bottom 20 of holder 40. Delimiting element 5 ensures that only coverslips of a corresponding (shorter) length can be received in holder 40 that is illustrated, i.e. the length of the coverslips is shorter than the length of the interior space of holder 40 or the length of bottom 20. A delimiting element that suitably limits the width of holder 40 can, in principle, also be present. The reason for such a delimiting element 5 is that coverslips of various sizes can be present in corresponding holders 40, said holders 40 all having the same external dimensions. No modifications to the device or the automatic machine are therefore needed in order to allow coverslips of different sizes to be used.

As is apparent from FIG. 1, bottom 20 of holder 40 has a recess 8 for manual removal of the stack of coverslips from holder 40. Side wall 21b has a corresponding recess 24. It is thereby possible, when the top side of holder 40 is open, to grasp a stack of coverslips from the top and bottom in the region of recess 8, and lift or slide it upward through the top opening of holder 40. This simplifies the removal or insertion of a new stack of coverslips from or into holder 40.

Bottom 20 of holder 40 furthermore has two holes 25 that are arranged in correspondence with the suction cups of the coverslip gripper. Holes 25 prevent bottom 20 of holder 40 from being itself suction-gripped by the suction cups of the coverslip gripper, and pulled upward, when the stack of coverslips has been emptied.

In the embodiment depicted, holder 40 comprises a foldable tab 7 that is shaped onto side wall 21a. The purpose of tab 7 is to allow holder 40 to be safely handled without contacting the actual coverslip stack region. Because tab 7 is foldable, it can be folded downward parallel to side wall 21a so as thereby to save space, for example, when packaging holder 40.

Delimiting line 6, i.e. the top delimiting line 6, facing away from bottom 20, of side walls 21a, 21b, 22a, 22b, lies in a plane that encloses an (acute) angle with the plane of bottom 20. The height of side wall 22a is thus lower than that of side wall 22b, as is also evident in particular from FIG. 2. This oblique delimiting line 6 of the top opening of holder 40 serves to allow the corresponding gripper arms to reach for a coverslip from the side of side wall 22a, in simple fashion, on a curved path into the interior of holder 40. Delimiting line 6 is furthermore embodied as a rim flange that functions as a support for holder 40 on a corresponding counterpart member in the device or automatic machine. This allows holder 40 to be easily inserted into and aligned in the device or automatic machine.

Figure 2:
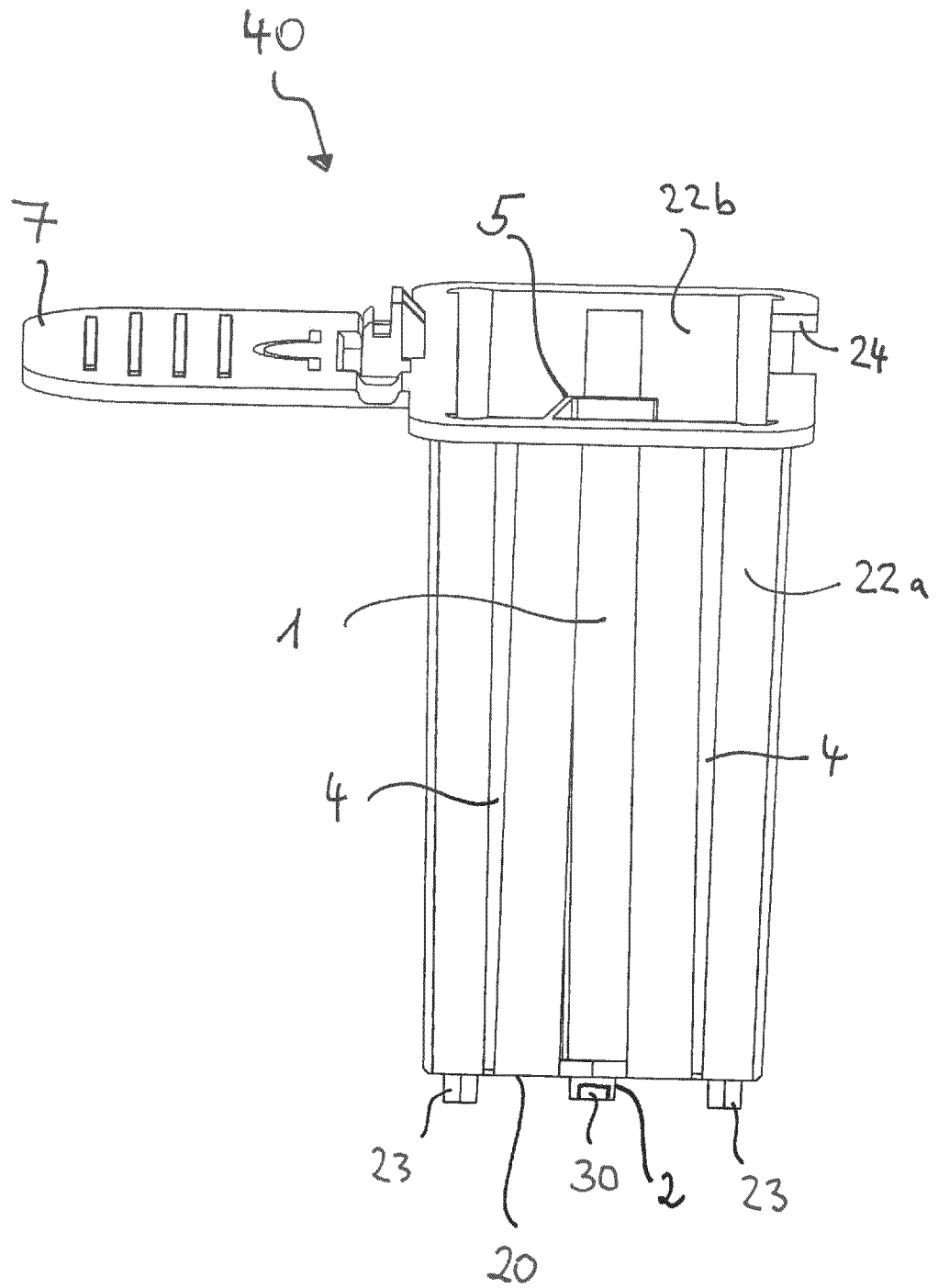
FIG. 2 is a perspective view from the side of the embodiment according to FIG. 1 of a holder according to the present invention.

FIG. 2 is a schematic perspective side view of holder 40 of FIG. 1. The same elements of holder 40 are labeled here with the same reference characters. Those elements are not explained further here, and reference is instead made to the statements in conjunction with FIG. 1. Bottom 20 of holder 40 has an RFID 30 that is set into the corresponding receptacle 2. Spacers 23 that extend perpendicularly to bottom 20 are also provided on the outer side of bottom 20 of holder 40. These spacers 23 can represent feet, or flanges that extend along side walls 21a and 21b. Spacers 23 on the one hand provide a secure support for holder 40 on a supporting surface, in order to prevent holder 40 from tipping or falling over and thus prevent possible damage to the coverslips. At the same time, spacers 23 serve to space RFID 30 away from the supporting surface and thus protect it from contact with the supporting surface. For stable support of holder 40, spacers 23 must extend, perpendicularly to bottom 20, over at least the same distance as receptacle 2 of the RFID with RFID 30 inserted.

Figure 3:
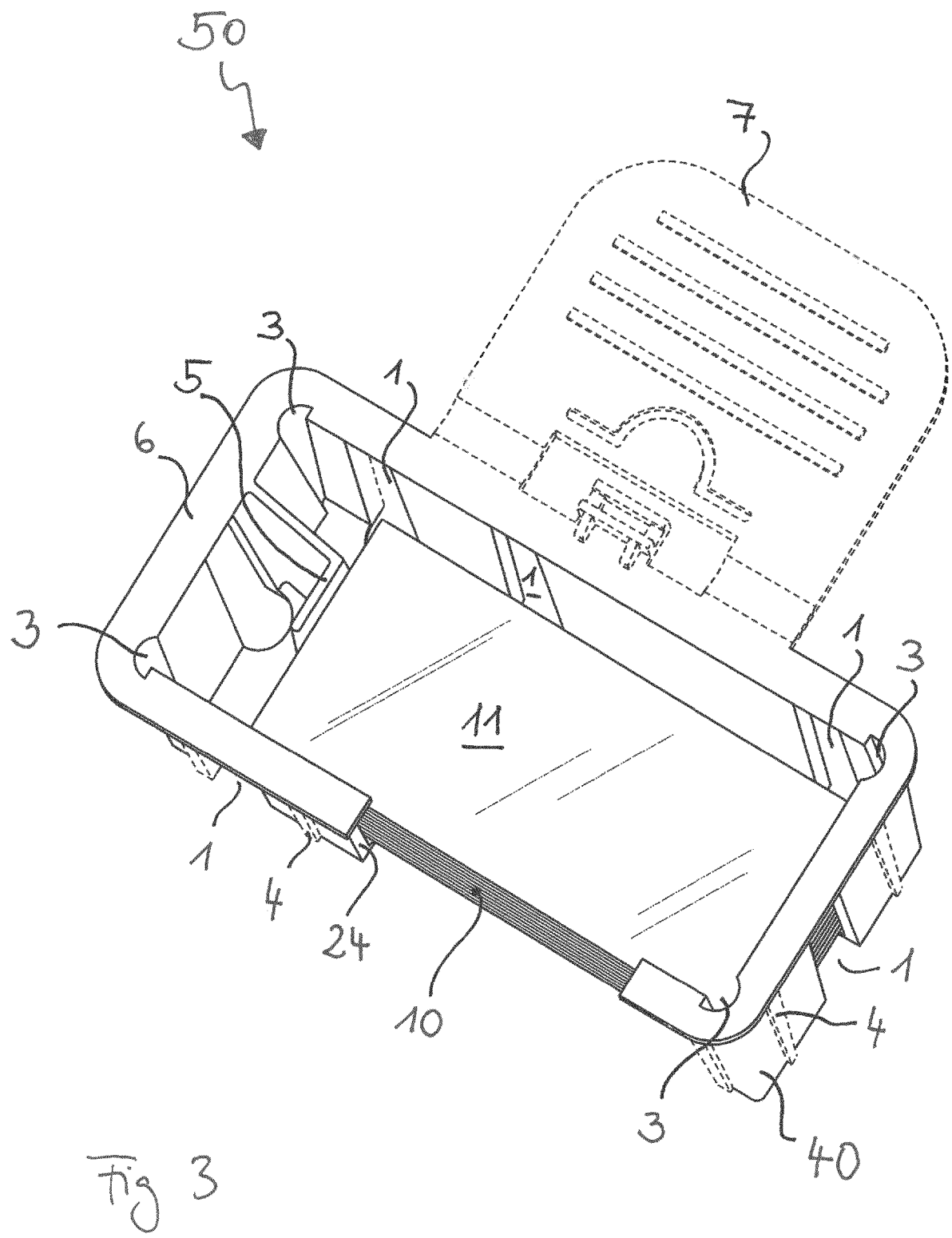
FIG. 3 shows an embodiment of a coverslip stack supply holder according to the present invention.

FIG. 3 shows a coverslip stack supply container or specimen slide stack supply container 50 in an embodiment, such that holder 40 corresponds to that of FIG. 1. Reference may therefore be made to the statements in conjunction with FIG. 1 regarding holder 40 or cartridge 40. Identical reference characters refer to identical elements. The side walls of holder 40 are not additionally labeled in FIG. 3. Reinforcing ribs 4 and foldable tab 7 are drawn here with dashed lines, but this is not of importance here.

A stack 10 of coverslips 11 is present in the interior of holder 40; coverslips 11 can be removed individually and automatically by a gripper arm that usually comprises two suction cups. Regarding further embodiments, reference may be made to the exemplifying embodiments in accordance with FIGS. 1 and 2.

PARTS LIST

1 Guidance grooves
2 Receptacle for RFID
3 Recess
4 Reinforcing rib
5 Delimiting element
6 Delimiting line, rim flange
7 Tab
8 Recess in bottom
10 Stack
11 Coverslips
20 Bottom
21a, b Side wall
22a, b Side wall
23 Spacer
24 Recess in side wall
25 Hole 30 RFID
40 Holder, cartridge
50 Coverslip stack supply holder

What is claimed is:

1. A holder for holding a stack of coverslips or specimen slides, the holder comprising:
a bottom having an inner side and an outer side, the inner side of the bottom being configured to support the stack;
at least one side wall connected to the bottom, the at least one side wall having an outer side and having a delimiting line facing away from the bottom, wherein the outer side of the bottom and/or the outer side of the at least one side wall is configured to receive an identification label; and
an identification label received by the outer side of the bottom;
wherein the identification label is an RFID;
wherein the delimiting line lies in a plane that intersects with a plane defined by the bottom at an acute angle to the plane defined by the bottom; and
wherein the outer side of the bottom comprises a receptacle extending perpendicularly from the bottom and a spacer extending substantially perpendicularly from the bottom, wherein the spacer extends in a direction perpendicular from the bottom at least as far as the receptacle extends in the direction perpendicular from the bottom, wherein the spacer and receptacle are spaced apart from one another, wherein the identification label is set into the receptacle.

2. The holder according to claim 1, wherein the bottom comprises a recess for facilitating removal of coverslips or specimen slides or of the stack of coverslips or specimen slides, and the at least one side wall comprises a corresponding recess.

3. The holder according to claim 1, wherein the bottom comprises at least one hole.

4. The holder according to claim 1, wherein at least one foldable tab is formed on the at least one side wall and extends outward from the at least one side wall.

5. The holder according to claim 1, wherein guidance grooves are formed in the at least one side wall.

6. The holder according to claim 1, wherein recesses are present in corner regions of the holder or in regions of the holder in which side walls abut against one another.

7. The holder according to claim 1, further comprising at least one delimiting element extending into the interior of the holder from the at least one side wall.

8. The holder according to claim 1, wherein the delimiting line is embodied in the form of a flange.

9. The holder according to claim 1, wherein the at least one side wall comprises at least one reinforcing rib formed thereon.

* * * * *